United States Patent
Kuhlburger

(10) Patent No.: US 6,891,001 B2
(45) Date of Patent: May 10, 2005

(54) PROCESS FOR THE GAS PHASE POLYMERIZATION OF OLEFINS

(75) Inventor: Jean-Jacques Kuhlburger, Kuala Lumpur (MY)

(73) Assignee: BP Chemicals Limited, London (GB)

( * ) Notice: Subject to any disclaimer, the term of this patent is extended or adjusted under 35 U.S.C. 154(b) by 137 days.

(21) Appl. No.: 10/240,719

(22) PCT Filed: Mar. 29, 2001

(86) PCT No.: PCT/GB01/01411

§ 371 (c)(1), (2), (4) Date: Mar. 21, 2003

(87) PCT Pub. No.: WO01/77191

PCT Pub. Date: Oct. 18, 2001

(65) Prior Publication Data

US 2003/0158354 A1 Aug. 21, 2003

(30) Foreign Application Priority Data

Apr. 6, 2000 (EP) .............................. 0043015

(51) Int. Cl.$^7$ ................................. C08F 2/34
(52) U.S. Cl. ................. 526/68; 526/106; 526/116; 526/348; 526/348.5; 526/348.6; 526/352; 526/901; 526/905
(58) Field of Search ............................ 526/68, 106, 116, 526/348, 348.5, 348.6, 352, 901, 905

(56) References Cited

U.S. PATENT DOCUMENTS 5,473,027 A 12/1995 Batchelor et al.

FOREIGN PATENT DOCUMENTS

| EP | 0 275 675 A2 | 7/1988 |
| EP | 0 640 625 A2 | 3/1995 |
| WO | WO 99/09075 | 2/1999 |
| WO | WO 99/12978 | 3/1999 |
| WO | WO 99/12982 | 3/1999 |
| WO | WO9912982 | * 3/1999 |

* cited by examiner

Primary Examiner—William K. Cheung
(74) Attorney, Agent, or Firm—Finnegan, Henderson, Farabow, Garrett and Dunner, L.L.P.

(57) ABSTRACT

A process for preparing and controlling the density of high density polyethylene in the gas phase comprising contacting ethylene or a mixture of ethylene and one or more alpha-olefins with a chromium oxide catalyst supported on a granular or microspherical refractory oxide in a fluidized bed reactor in the presence of oxygen.

7 Claims, No Drawings

PROCESS FOR THE GAS PHASE POLYMERIZATION OF OLEFINS

BACKGROUND OF THE INVENTION

The present invention relates to a process for preparing high density polyethylene in the gas phase comprising contacting ethylene or a mixture comprising ethylene and one or more alpha-olefins with a chromium oxide catalyst supported on a granular or microspherical refractory oxide in a fluidised bed reactor in the presence of oxygen. The present invention further relates to a process for controlling the density of high density polyethylene prepared in the gas phase comprising contacting ethylene or a mixture comprising ethylene and one or more alpha-olefins with a chromium oxide catalyst supported on a granular or microspherical refractory oxide in a fluidised bed reactor in the presence of oxygen.

In two foreign references, Ermakov et al., "Transfer Processes During Polymerization of Ethylene on a Chromium Oxide Catalyst, II, The Role of Impurities in Transfer Reactions," Kinetika i Kataliz (USSR), Vol. 10, No. 2 (1969) and Dahlig et al., Khimiya i Teknologiya Polimerov, No. 4, 23 (1961), the use of oxygen (and also carbon monoxide, acetylene, carbon dioxide, and hydrogen in the Ermakov reference) is disclosed as having the effect of lowering the molecular weight of polyethylene produced in a chromium based catalyzed polymerization of ethylene.

The prior art also includes some references disclosing the use of oxygen in the course of the gas phase polymerisation of ethylene.

U.S. Pat. No. 5,473,027 (Chevron) discloses a process for making polyethylene resin by reacting ethylene in the presence of a titanium modified chromium catalyst on a silica support in a gas-phase polymerization reactor and in the presence of a catalyst productivity reduction agent such as oxygen. The presence of oxygen allows to increase the melt flow ratio (MFR) of the resin which is particularly suitable for use in blow-molding applications.

It is thus known that high density polyethylene showing superior physico-mechanical properties (e.g. MFR, die swell, . . .) could be obtained by polymerising ethylene with a chromium oxide catalyst in a fluidised bed reactor in the presence of oxygen.

However, the Industry is continuously striving to find high density polyethylene which can be more easily processed and which exhibits still better product performances.

SUMMARY OF THE INVENTION

An object of the present invention is to provide such high density polyethylene. In particular, the present invention relates to a process for preparing high density polyethylene in the gas phase comprising contacting ethylene or a mixture comprising ethylene and one or more alpha-olefins with a chromium oxide catalyst supported on a granular or microspherical refractory oxide in a fluidised bed reactor in the presence of oxygen.

The present invention relates to a process for preparing high density polyethylene in the gas phase comprising contacting ethylene or a mixture comprising ethylene and one or more alpha-olefins with a chromium oxide catalyst supported on a granular or microspherical refractory oxide in a fluidised bed reactor having a recycle gas line, under polymerisation conditions, characterised in that
(i) oxygen is introduced into the reactor in the range of about 0.03 to about 1 part by volume of oxygen per million parts by volume of ethylene;
(ii) an organoaluminium compound is introduced into the reactor in the range of 0.0001 to 0.05 mole per ton of ethylene; and
(iii) the polymerisation is carried out at a temperature in the range of 80 to 120° C.

DETAILED DESCRIPTION OF THE INVENTION

The high density polyethylene (HDPE) is either a homopolymer of ethylene or a copolymer of ethylene and one or more alpha-olefins. The alpha-olefin can have 3 to 12 carbon atoms, preferably 3 to 8 carbon atoms. Examples of alpha-olefins are propylene, 1-butene, 1-pentene, 1-hexene, 4-methyl-1-pentene, and 1-octene. 1-butene and 1-hexene are the preferred alpha-olefins, 1-hexene being the most preferred one.

The density of the HDPE can be in the range of 0.942 to 0.969 gram per cubic centimetre, and is preferably in the range of 0.948 to 0.967 gram per cubic centimetre.

According to the present invention, the polymerisation of ethylene is performed in the presence of a chromium oxide catalyst supported on a granular or microspherical refractory oxide. Preferably, the amount of catalyst is in the range of about 0.002 to about 0.05 part by weight based on 100 parts by weight of the high density polyethylene.

Examples of chromium oxide catalysts according to the present invention are typically those comprising a refractory oxide support which is activated by a heat treatment advantageously carried out at a temperature of at least 250° C. and at most equal to the temperature at which the granular support begins to sinter and under a non-reducing atmosphere and preferably an oxidising atmosphere. This catalyst can be obtained by a great number of known process, in particular by those according to which, in a first stage, a chromium compound, such as a chromium oxide, generally of formula CrO3, or a chromium compound which can be converted by calcination into chromium oxide, such as, for example, a chromium nitrate or sulphate, an ammonium chromate, a chromium carbonate, acetate or acetylacetonate, or a tert-butyl chromate, is combined with a granular support based on refractory oxide, such as, for example, silica, alumina, zirconium oxide, titanium oxide or a mixture of these oxides or aluminium or boron phosphates or mixtures in any proportion of these phosphates with the above mentioned oxides. In a second stage, the chromium compound thus combined with the granular support is subjected to a so-called activation operation by heat treatment in a non-reducing atmosphere and preferably an oxidising atmosphere at a temperature of at least 250° C. and at most that at which the granular support begins to sinter. The temperature of the heat treatment is generally between 250° C. and 1200° C. and preferably between 350 and 1000° C.

The catalyst preferably contains from 0.05 to 5%, more preferably from 0.1 to 3%, by weight of chromium.

The catalyst can contain, in addition to the chromium, from 0.1 to 10% of titanium in the form of titanium oxide and/or fluorine and/or aluminium, in particular in the form of aluminium oxide. According to a preferred embodiment of the present invention, the catalyst is advantageously a titanium or aluminium modified supported chromium oxide based catalyst, most preferably a titanium modified supported chromium oxide based catalyst. For example, the catalyst can be modified with from 0.1 to 8% by weight titanium or 0.1 to 6% by weight of aluminium.

The catalyst is supported on a granular or microspherical refractory oxide such as silica, alumina, zirconia oxide or a mixture or a coprecipitate of these oxides. The support can be obtained by various known processes, especially by precipitation of silicon compounds such as, for example, silica, from a solution of an alkali metal silicate, (or else by coprecipitation of a refractory oxide gel or hydrogel from solutions containing at least two compounds chosen from silicon, titanium, zirconium or aluminium compounds).

The granular support advantageously has a specific (BET) surface of between 200 and 1200 $m^2/g$, a pore volume ranging from 1 to 3.5 ml/g, and can consist of particles which have a diameter of between 20 and 250 μm, preferably between 30 and 150 μm. It advantageously contains hydroxyl functional groups and is preferably free from water at the time of its use during the preparation of the catalyst.

The catalyst is preferably prepared by a process comprising a first stage during which the support is impregnated with a chromium compound, and a second optional preferred stage during which the product originating from the first stage is impregnated with either a titanium or an aluminium compound. The chromium compound employed can be a chromium oxide, generally of formula $CrO_3$, or a chromium compound which can be converted into chromium oxide by calcining, such as, for example, a chromium nitrate or sulfate, an ammonium chromate, a chromium carbonate, acetate or acetylacetonate or else a tertbutyl chromate.

Titanium compounds which can advantageously be employed are titanium alcoholate such as, for example, titanium tetraisopropylate or titanium tetra-butylate. Aluminium compounds which can advantageously be employed are for example of the acetyl acetate, acetylacetonate, alkoxy, or alkyl types.

The impregnation of the support with the titanium or the aluminium compound can be performed advantageously just before or during the heat treatment procedure applied to the catalyst.

The catalyst can also be prepared by a process which consists of a coprecipitation of a gel or hydrogel such as that referred to above in the presence of a chromium compound and of a titanium compound, so that a cogel is formed comprising, on the one hand, at least one refractory oxide such as silica or alumina, and, on the other band, a chromium compound and a titanium compound.

The catalyst can be introduced in the form of a coated catalyst or prepolymer containing, for example, from 10-5 to 3, preferably from 10-3 to 10-1, millimoles of chromium per gram of polymer. According to another embodiment of the present invention, the catalyst is directly injected into the gas phase polymerisation reactor.

Examples of catalysts can be found, for example, in EP275675, EP453116, U.S. Pat. No. 3,622,521, EP640625, U.S. Pat. No. 5,473,027 or WO9912978, the contents of which are hereby incorporated by reference.

The present invention relates to a process for preparing high density polyethylene in the gas phase in a fluidised bed reactor, under polymerisation conditions, characterised in that an organoaluminium compound is introduced into the reactor in the range of 0.0001 to 0.05 mole per ton of ethylene, preferably between 0.001 to 0.01 mole per ton of ethylene. According to a preferred embodiment of the present invention, the organoaluminium compound is directly introduced into the reactor; this means that the organoaluminium added according to the present invention is not the cocatalyst that would potentially be used during a prepolymerisation step; this also means that, if the organoaluminium is introduced in the recycle line, it is then preferably introduced at a point of the recycle line which is located close to the entry point of the recycle line into the bottom of the reactor. For example, in industrial operations, it is preferred to introduce the organoaluminium compound either directly into the reactor or in the recycle line at a point located at less than 8 meters, preferably less than 6 meters before the entry point of the recycle line into the bottom of the reactor. Examples of organoaluminium compounds which can be used according to the present invention are dimethylaluminiumchloride, trimethylaluminium, triisobutylaluminium, or triethylaluminium. The preferred organoaluminium compounds are trialkylaminium, more preferably triethylaluminium. The organoaluminium is preferably diluted in a solution of hydrocarbon compound, e.g. as a 1 to 10% by weight solution of organoaluminium in pentane or hexane.

The polymerisation is preferably carried out continuously in a vertical fluidised bed reactor; these techniques are known in themselves and corresponding equipment are described e.g. in European patent application EP-0 855 411, French Patent No. 2,207,145, U.S. Pat. No. 4,482,687 or French Patent No. 2,335,526. The process of the invention is particularly well suited to industrial-scale reactors of very large size, e.g. fluidised bed polymerisation reactors annually producing at least 100 thousand tons, preferably 200 thousand tons of polymer.

During the polymerisation, the bed comprises growing polymer particles and catalyst particles fluidised by polymerisation and modifying gaseous components introduced at a flow rate or velocity sufficient to cause the particles to separate and act as a fluid. The fluidising gas is made up of the initial feed, make-up feed, and cycle (recycle) gas, i.e., ethylene, optional other alpha-olefins and/or inert carrier gas (e.g. nitrogen), and other reactor gases. According to a preferred embodiment, part of the fluidising gas is cooled to a temperature at which liquid condenses which allows to reach higher productivities.

When liquid condenses out of the recycle gaseous stream, it can be a condensable monomer, e.g. but-1-ene, hex-1-ene, 4-methylpent-1-ene or octene used as a comonomer, and/or an optional inert condensable liquid, e.g. inert hydrocarbon (s), such as C4-C8 alkane(s) or cycloalkane(s), particularly butane, pentane or hexane.

According to a preferred embodiment of the present invention, the partial pressure of ethylene is in the range of 2 to 10 bara, more preferably between 2 to 6 bara.

Oxygen is introduced into the reactor in the range of about 0.03 to about 1 part by volume of oxygen per million parts by volume of ethylene, more preferably between 0.035 to 0.2. According to a preferred embodiment of the present invention, oxygen is directly introduced into the reactor; if introduced in the recycle line, it is then preferably introduced at a point of the recycle line which is located close to the entry point of the recycle line into the bottom of the reactor. For example, in industrial operations, it is preferred to introduce oxygen either directly into the reactor or in the recycle line at a point located at less than 8 meters, preferably less than 4 meters before the entry point of the recycle line into the bottom of the reactor, for example in the fresh ethylene stream located less than 1 meter before the recycle line that enters into the reactor.

The molar ratio of alpha-olefin, if present, to ethylene is preferably comprised between 0.001:1 to 0.004:1, more preferably between 0.0015:1 to 0.002:1.

The high density polyethylene according to the present invention can be extruded into various products in conventional extruders and processes for extrusion. Of particular interest here is the blow moulding process.

One of the main advantages of the present invention lies in the density potential shown by the HDPE resin of the invention compared to the density obtained with the techniques of the prior art, all the other major characteristics of the invention resin being either maintained or even further improved. This density potential is clearly reflected in the examples and comparative examples.

According to a further embodiment of the present invention, there is now provided a process for controlling the density of high density polyethylene in the gas phase comprising contacting ethylene or a mixture comprising ethylene and one or more alpha-olefins with a chromium oxide catalyst supported on a granular or microspherical refractory oxide in a fluidised bed reactor having a recycle gas line, under polymerization conditions, characterised in that (i) oxygen is introduced into the reactor in the range of about 0.03 to about 1 part by volume of oxygen per million parts by volume of ethylene;

(ii), an organoaluminium compound is introduced into the reactor in the range of 0.0001 to 0.05 mole per ton of ethylene; and (iii) the polymerisation is carried out at a temperature in the range of 80 to 120° C.

In the course of their products developments, the applicants have unexpectedly found that it was now possible to control the density of HDPE by using the invention process. The HDPE resins of the present invention have superior properties and microstructure characteristics that make them processable into pellets particularly suitable for blow moulding applications.

The following examples illustrate the present invention.

EXAMPLES a) Catalyst Preparation

A silica supported chromium oxide based catalyst composition sold under the registered trade mark <<EP30>> (by Joseph Crosfield and Sons, Warrington, United Kingdom) is introduced into a reactor heated to 93° C. and fluidised with a current of dry nitrogen. This solid composition contains about 1% by weight of chromium in the form of trivalent chromium acetate supported on silica. The reactor is next heated and maintained at 150° C. Thereafter a mixture of titanium tetraisopropylate and tetra-n-butylate sold under the registered trade mark <<Tilcom BIP>> (by Titanium Intermediates Limited, Billingham, United Kingdom) is added to the reactor in a quantity corresponding to 23.75 moles of titanium. The catalytic solid thus formed is then heat treated (450° C.) and respectively fluidised with nitrogen and a dry air stream. The fluidising air is then replaced by a dry nitrogen stream and the catalytic solid is cooled slowly to ambient temperature.

The activated catalyst containing 4% by weight of titanium and 1% by weight of chromium are recovered; it is composed of particles with a weight average diameter of 103 μm. It is stored in an atmosphere of dry nitrogen.

b) Prepolymer Preparation

An operation of ethylene prepolymerisation is carried out in a reactor at a temperature of 71–75° C. in a solution of n-hexane in the presence of the catalyst described above (a). The ethylene prepolymer consists of about 38 kg PE/mol Cr.

c) Polymerisation

The polymerisation is carried out in a typical industrial fluidised bed reactor using the prepolymer described above (b).

All the conditions and polymer properties are indicated in Table 1. When used, triethylaluminium is introduced into the recycle line as a 4% by weight solution in hexane at a point located 6 meter before the entry of the recycle line into the reactor.

Oxygen as a 5% by volume concentration in nitrogen is introduced in the fresh ethylene feed stream at a point located less than 1 meter before the recycle line that enters into the reactor.

TABLE 1

|  | Comp Ex 1 | Comp Ex 2 | Ex 1 | Ex 2 |
|---|---|---|---|---|
| Tpoly (° C.) | 91.3 | 96.6 | 94.9 | 97.6 |
| Total pressure (bar g) | 18.6 | 19.6 | 19.3 | 18.6 |
| Ethylene pressure (bar) | 4.8 | 3.8 | 5.3 | 5.2 |
| butene rate (kg/h) | 0 | 0 | 0 | 0 |
| TEA (mol/ton ethylene) | 0 | 0 | 0.0042 | 0.0014 |
| $O_2$:$C_2$ (ppm wt) | 0.25 | 0.15 | 0.1 | 0.15 |
| Vf (cm/s) | 57.1 | 64.6 | 63.9 | 65.5 |
| Production rate (ton/h) | 14.8 | 16.2 | 13 | 15.2 |
| Cr (ppm) | 3.3 | 3.8 | 3.0 | 3.3 |
| density** ($kg/m^3$) | 955.1 | 955.1 | 955.6 | 956.3 |
| average activity (g/mMolhb) | 522 | 655 | 573 | 572 |

**Said density is measured according to ISO1872/1-1993

It is clear from the above table that, thanks to the present invention, it has been possible to produce a HDPE resin showing a higher density compared to prior art methods.

What is claimed is:

1. A process for preparing high density polyethylene in the gas phase comprising contacting ethylene or a mixture including ethylene and one or more alpha-olefins with a chromium oxide catalyst supported on a granular or microspherical refractory oxide in a fluidized bed reactor having a recycle gas line, under polymerization conditions, wherein:

(i) oxygen is introduced into the reactor in the range of from about 0.03 to about 1 part by volume of oxygen per million parts by volume of ethylene;

(ii) an organoaluminium compound is introduced into the reactor in the range of from 0.0001 to 0.05 mole per ton of ethylene; and (iii) polymerization is carried out at a temperature in the range of from 80 to 120° C.

2. The process of claim 1 wherein the high density polyethylene is a homopolymer of ethylene or a copolymer of ethylene and 1-butene or 1-hexene.

3. The process of claim 1 or 2, wherein the density of the high density polyethylene is in the range of from 0.948 to 0.967 gram per cubic centimeter.

4. The process of claim 1 wherein the chromium oxide catalyst supported on a granular or microspherical refractory oxide is a titanium or aluminium modified silica supported chromium oxide catalyst.

5. The process of claim 1 wherein the organoaluminium compound is introduced into the reactor in the range of from 0.001 to 0.01 mole per ton of ethylene.

6. The process of claim 1 wherein the organoaluminium compound is a trialkylaluminium.

7. the process of claim 6 wherein the trialkylaluminium is triethylaluminium.

* * * * *

UNITED STATES PATENT AND TRADEMARK OFFICE
CERTIFICATE OF CORRECTION

PATENT NO. : 6,891,001 B2
DATED : May 10, 2005
INVENTOR(S) : Jean-Jacques Kuhlburger and Kenneth John Rowley It is certified that error appears in the above-identified patent and that said Letters Patent is hereby corrected as shown below:

Title page,
Item [75], Inventor, after "Lumpur (MY)", insert -- Kenneth John Rowley, Shropshire (UK) --

Signed and Sealed this

Twelfth Day of July, 2005

JON W. DUDAS
*Director of the United States Patent and Trademark Office*